(12) United States Patent
Kano

(10) Patent No.: US 9,030,166 B2
(45) Date of Patent: May 12, 2015

(54) ELECTRONIC DEVICE, AND METHOD CONTROLLING ELECTRONIC POWER SUPPLY

(75) Inventor: Goro Kano, Yokohama (JP)

(73) Assignee: Nikon Corporation, Tokyo (JP)

( * ) Notice: Subject to any disclaimer, the term of this patent is extended or adjusted under 35 U.S.C. 154(b) by 686 days.

(21) Appl. No.: 12/828,553

(22) Filed: Jul. 1, 2010

(65) Prior Publication Data

US 2011/0001454 A1    Jan. 6, 2011

(30) Foreign Application Priority Data

Jul. 3, 2009 (JP) .................................. 2009-158764
Jul. 10, 2009 (JP) .................................. 2009-163596

(51) Int. Cl.
*H02J 7/00* (2006.01)
*G06F 1/26* (2006.01)
*G06F 1/32* (2006.01)
*G06F 13/20* (2006.01)

(52) U.S. Cl.
CPC ............... *G06F 1/266* (2013.01); *G06F 1/263* (2013.01); *G06F 1/3212* (2013.01)

(58) Field of Classification Search
USPC ......................................... 320/107, 114, 115
See application file for complete search history.

(56) References Cited

U.S. PATENT DOCUMENTS 5,053,804 A * 10/1991 Odaka et al. .................. 396/206
6,191,568 B1 * 2/2001 Poletti ........................... 323/268
7,250,968 B2 * 7/2007 Ito ................................. 348/240.2
7,499,640 B2 * 3/2009 Koyama ........................ 396/201
7,631,203 B2 * 12/2009 Irie ................................. 713/310
2004/0246341 A1 * 12/2004 Lee et al. .................. 348/207.99
2005/0114570 A1 * 5/2005 Chang et al. ...................... 710/62
2005/0127879 A1 * 6/2005 Sato et al. ........................ 320/134
2005/0144495 A1 6/2005 Nakajima et al.
2007/0188621 A1 * 8/2007 Kitagawa ................. 348/211.99

(Continued)

FOREIGN PATENT DOCUMENTS

JP    A-1-260516    10/1989
JP    A-06-019593    1/1994

(Continued)

OTHER PUBLICATIONS

Office Action issued in Japanese Patent Application No. 2009-158764 dated Apr. 12, 2011 (with translation).

(Continued)

*Primary Examiner* — Drew A Dunn
*Assistant Examiner* — Steve T Chung
(74) *Attorney, Agent, or Firm* — Oliff PLC

(57) ABSTRACT

An electric device including: a connecting unit connected to a connection line supplying an electric power of a predetermined rating and transmitting and receiving an information; a charging unit conducting a charging of a charging battery connected to an own device, by the electric power supplied by the connection line; an electric supplying unit supplying an electric power to a recording medium storing an information; a reading-and-writing unit performing a reading-and-writing operation of the recording medium; and an electronic source controlling unit performing a control of the electric power supplied to the charging unit, when the reading-and-writing unit performs the reading-and-writing operation of the recording medium, according to an access request to the recording medium via the connection line.

10 Claims, 5 Drawing Sheets

(56) References Cited

U.S. PATENT DOCUMENTS

2008/0074501 A1* 3/2008 Matsushima ............ 348/207.11
2009/0160404 A1   6/2009 Iwai

FOREIGN PATENT DOCUMENTS

| JP | A-09-261888 | 10/1997 |
| --- | --- | --- |
| JP | A-11-191262 | 7/1999 |
| JP | A-2000-357029 | 12/2000 |
| JP | A-2001-202144 | 7/2001 |
| JP | A-2002-049444 | 2/2002 |
| JP | A-2003-032910 | 1/2003 |
| JP | A-2003-044179 | 2/2003 |
| JP | A-2004-78740 | 3/2004 |
| JP | A-2004-086647 | 3/2004 |
| JP | A-2004-328037 | 11/2004 |
| JP | A-2005-012889 | 1/2005 |
| JP | A-2005-173822 | 6/2005 |
| JP | A-2006-115656 | 4/2006 |
| JP | A-2006-352255 | 12/2006 |
| JP | A-2009-151488 | 7/2009 |
| JP | A-2010-015582 | 1/2010 |
| JP | A-2010-206948 | 9/2010 |

OTHER PUBLICATIONS

Office Action issued in Japanese Patent Application No. 2009-163596 dated Apr. 19, 2011 (with translation).
Office Action issued in Japanese Patent Application No. 2009-158764 dated Dec. 6, 2011 (with translation).
Jun. 26, 2013 Notification of First Office Action issued in Chinese Application No. 201010221093.2 (with English Translation).
Jun. 10, 2014 Search Report issued in European Patent Application No. 10168084.1.
Chinese Office Action issued in Chinese Patent Application No. 201010221093.2 dated Jan. 30, 2014 (w/ translation).

* cited by examiner

ELECTRONIC DEVICE, AND METHOD CONTROLLING ELECTRONIC POWER SUPPLY

BACKGROUND OF THE INVENTION

1. Field of the Invention

The present application relates to an electronic device, which is driven by a secondary battery (a chargeable battery), and a method controlling an electronic power supply for this electronic device.

The present application claims priority on Japanese Patent Application No. 2009-158764, filed Jul. 3, 2009; and on Japanese Patent Application No. 2009-163596, filed Jul. 10, 2009; the content of which is incorporated herein by reference.

2. Description of the Related Art

Conventionally, a technology is known which charges a secondary battery, which is embedded in an electronic device such as a digital camera, through a USB (Universal Serial Bus) cable. See, for example, Japanese Unexamined Patent Application, First Publication No. 2005-173822 (hereinafter referred to as Patent Document 1).

However, there is a limit on the amount of electric current provided from an external host device via a USB cable. This limit is based on a USB specification. Therefore, depending on the operation mode of digital cameras and the like, there is a problem in that the operation of charging a secondary battery cannot be controlled in an appropriate manner.

In addition, the power feeding capacity of a USB is specified as a predetermined rating. Therefore, there is a problem in that an operation, which requires a large amount of electric power exceeding the predetermined rating, cannot be performed appropriately while the secondary battery is being charged via a USB cable. For example, operations such as the driving of a lens barrel cannot be performed appropriately while the secondary battery is being charged via a USB cable.

SUMMARY OF THE INVENTION

The present invention is made considering the problems described above. Accordingly, an object of the present invention is to provide an electronic device which appropriately controls the charging operation of a secondary battery, as well as a method for controlling an electronic power supply.

In addition, another object of the present invention is to provide a technology such that, while a secondary battery is being charged with an electric current at a predetermined rating, an operation which requires a large amount of electric current exceeding this predetermined rating can be executed appropriately.

An electric device according to an aspect of the present invention includes: a connecting unit connected to a connection line supplying an electric power of a predetermined rating and transmitting and receiving an information; a charging unit conducting a charging of a charging battery connected to an own device, by the electric power supplied by the connection line; an electric supplying unit supplying an electric power to a recording medium storing an information; a reading-and-writing unit performing a reading-and-writing operation of the recording medium; and an electronic source controlling unit performing a control of the electric power supplied to the charging unit, when the reading-and-writing unit performs the reading-and-writing operation of the recording medium, according to an access request to the recording medium via the connection line.

Based on the above electronic device according to an aspect of the present invention, an operation of charging a secondary battery, which drives an electronic device, can be controlled appropriately.

A method controlling an electronic power supply according to an aspect of the present invention is a method of controlling an electronic power supply of an electronic device including a charging unit, a reading-and-writing unit, an electric source controlling unit, and an electric power supplying unit. Here, the charging unit conducts a charging of a charging battery connected to an own device, by an electric power supplied by a connection line supplying an electric power of a predetermined rating and transmitting and receiving an information. In addition, the reading-and-writing unit performs a reading-and-writing operation of a recording medium recording an information. Further, the electronic source controlling unit performs a control of the electric power supplied to the charging unit, when the reading-and-writing unit performs the reading-and-writing operation of the recording medium recording the information. Moreover, the power supplying unit supplies an electric power to the recording medium. In addition, the reading-and-writing unit performs a reading-and-writing operation of the recording medium.

Based on the above method controlling the electronic power supply according to an aspect of the present invention, it is possible to appropriately perform an operation which requires a large amount of electric current exceeding a predetermined rating, while a secondary battery is being charged with an electric current at the predetermined rating.

DETAILED DESCRIPTION OF THE PREFERRED EMBODIMENTS

Hereunder, an electronic device and a method controlling an electronic power supply according to an aspect of the present invention are described.

The following explanation aims to provide a detailed explanation in order to facilitate the understanding of the gist of the present invention. Therefore, the following explanation does not limit the present invention in any way, except as specifically noted.

Hereunder, a first embodiment of the present invention is described with reference to the diagrams.

Figure 1:
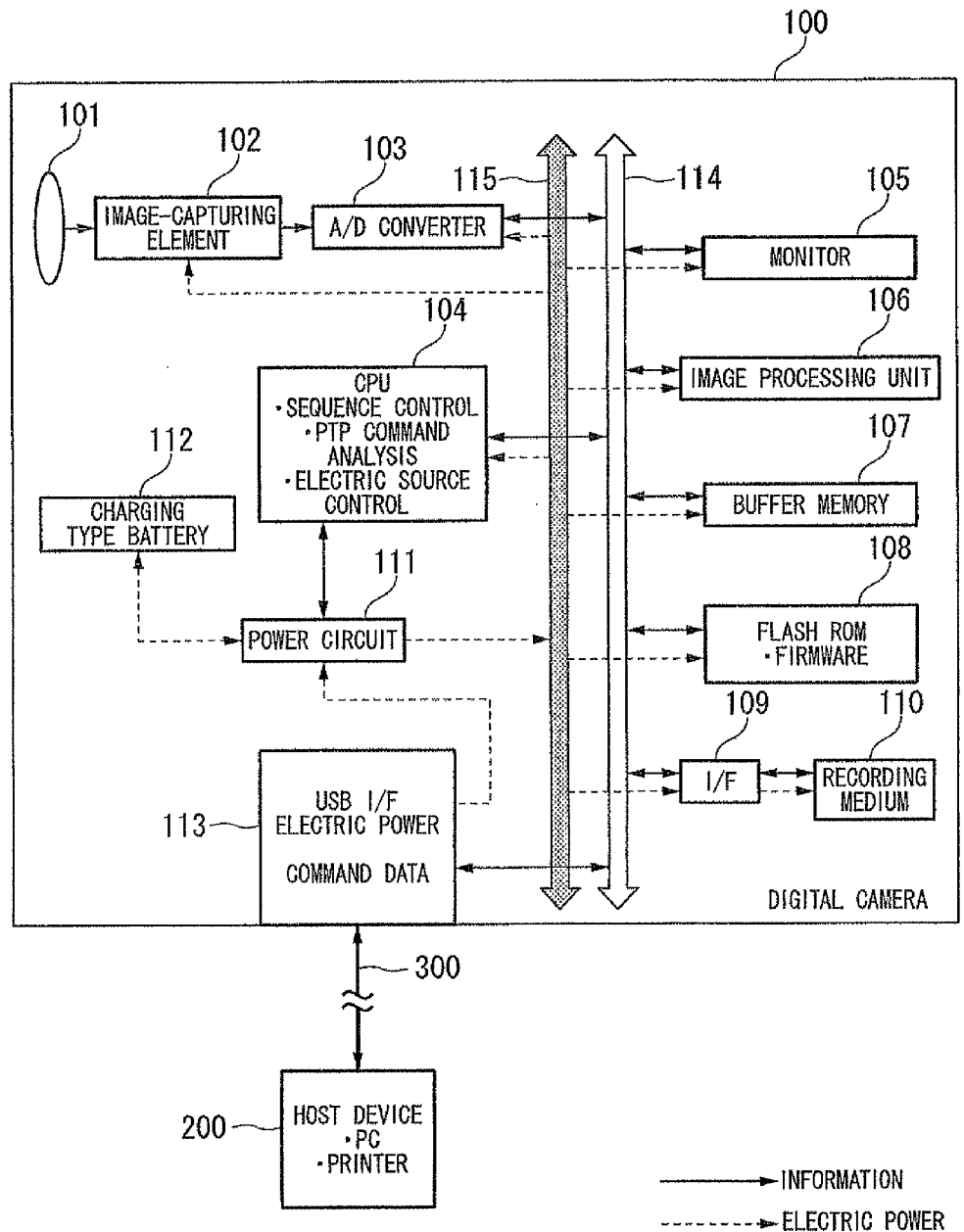
FIG. 1 is an overall configuration diagram of a digital camera according to a first embodiment of the present invention.

FIG. 1 is an overall structural diagram of a digital camera according to the present embodiment.

A digital camera 100 includes an imaging lens 101, an image-capturing element 102, an A/D (Analog/Digital) converter 103, a CPU (Central Processing Unit) 104, a monitor 105, an image processing unit 106, a buffer memory 107, a flash ROM (Read Only Memory) 108, a recording medium I/F (Interface) 109, a recording medium 110, a power circuit 111, a charging type battery 112, a USB I/F 113, a bus 114, and a DCC (Direct Current Cable) 115.

In addition, the digital camera 100 communicates with a host device 200 such as a PC or a printer via a USB cable 300. In addition, the digital camera 100 receives a supply of electricity from the host device 200.

The A/D converter 103 converts an image of a subject, which is formed on the image-capturing element 102 through the imaging lens 101, into a digital signal.

The CPU 104 executes a control of a sequence (the order of execution), an analysis of a PTP (Picture Transfer Protocol) command, and a control of the electric power supply.

The monitor 105 operates as a part of a user interface by displaying letters and image information such as an operation menu of the digital camera 100 and error messages, by displaying a warning, and by displaying information on a condition.

The image processing unit 106 receives and displays a live view (real time) image, a confirmation image after photographing, and a photographed image stored in the recording medium 20. The live view image is obtained by performing a predetermined signal processing on a digital image signal obtained by the A/D converter 103.

The buffer memory 107 stores a temporary data required for input and output.

The flash ROM 108 records a firmware specifying a basic sequence for controlling the digital camera 100. In addition, the flash ROM 108 stores a digital image signal created by the A/D converter 103.

The recording medium I/F 109 supplies electric current to the recording medium 110, and performs a reading-and-writing operation of the recording medium 110 according to a command by the CPU 104.

The recording medium 110 is a memory card which is detachably attached to the digital camera 100. The recording medium 110 stores a digital image signal created by the A/D converter 103.

The power circuit 111 charges the charging type battery 112, and supplies electric current to each processing unit of the digital camera 100. In addition, the power circuit 111 monitors the electric voltage between the terminals of the charging type battery 112, and determines whether the charging has been completed. The power circuit 111 also determines how much battery is remaining. Furthermore, based on a command from the CPU 104, the power circuit 111 controls the amount of electric current that is used to charge the charging type battery 112.

The USB I/F 113 is connected to a USB cable. The USB I/F 113 receives a command and a supply of electric current from the host device 200. The maximum amount of the supply of electric current is 500 mA.

The bus 114 is a common pathway through which a signal is received and transmitted among each processing unit of the digital camera 100.

The DCC 115 is a common pathway through which electric power is supplied to each processing unit of the digital camera 100.

According to the above configuration, the power circuit 111 of the digital camera 100 charges the charging type battery 112 with an electric current supplied by the USB cable 300. In addition, when the recording medium 110 is read and written based on an access request for information via the USB cable 300, the power circuit 111 controls the electric current supplied in order to charge the charging type battery 112, the recording medium I/F 109 supplies electric current to the recording medium 110, and the recording medium I/F 109 performs a reading-and-writing operation on the recording medium 110 according to a command by the CPU. In addition, when the reading-and-writing operation is performed on the flash ROM 108 based on an access request for information via the USB cable 300, the electric circuit controls the electric current supplied for charging the charging type battery 112. Further, the power circuit 111 supplies electric current to the flash ROM 108. In addition, the CPU 104 performs the reading-and-writing operation of the flash ROM.

According to the configurations described above, the charging operation with respect to the charging type battery 112 which drives the digital camera 100, is controlled appropriately.

Next, an operation controlling a charging of the digital camera 100 is described.

Figure 2:
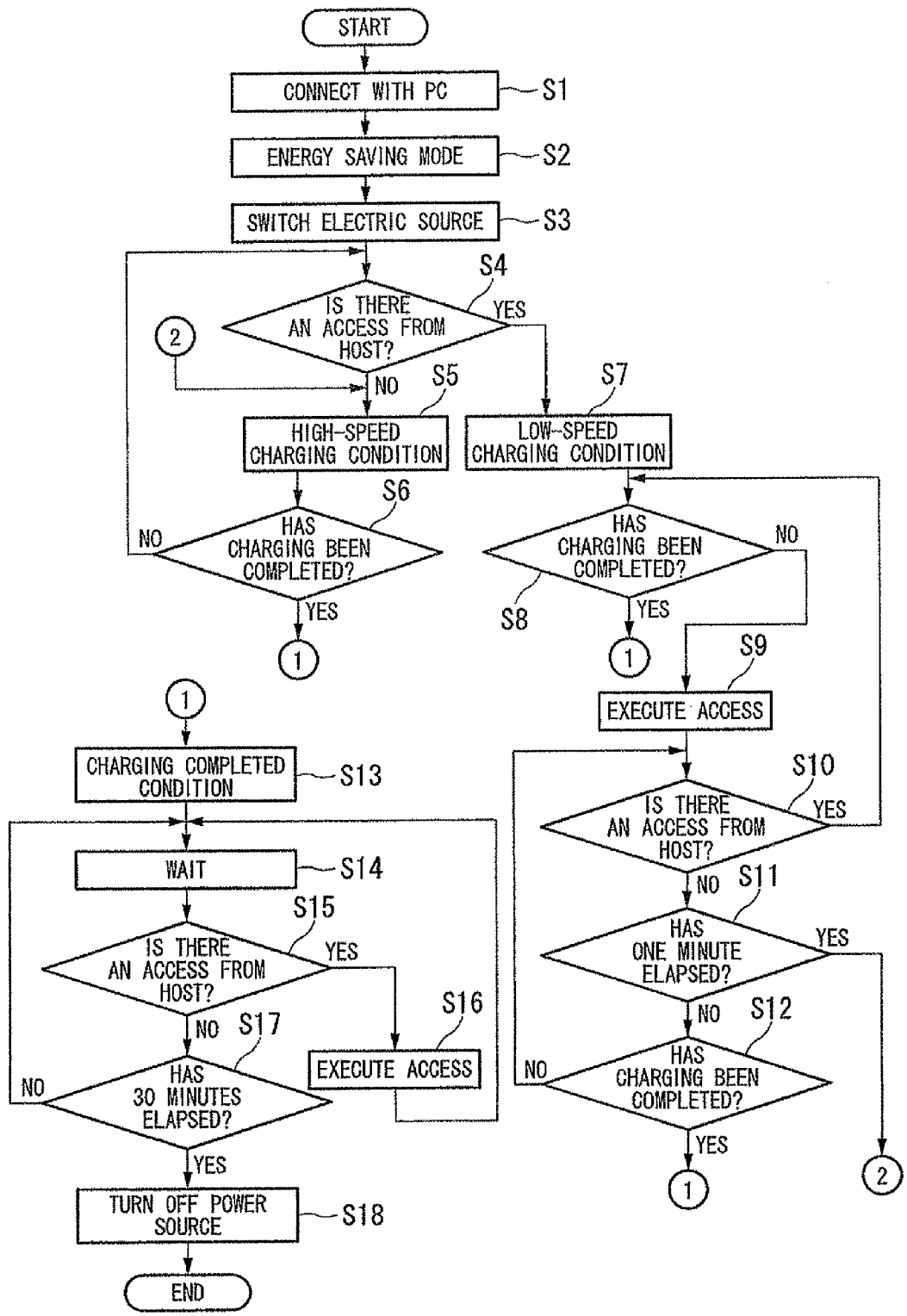
FIG. 2 is a flowchart representing an operation controlling a charging of a digital camera according to the above embodiment.

FIG. 2 is a flowchart representing an operation controlling a charging of a digital camera according to the above embodiment.

First, the USB I/F 113 of the digital camera 100 is connected to the host device 200 via the USB cable 300 (step S1). Then, the CPU 104 outputs an instruction to transition to an energy saving mode (step S2). During this energy saving mode, the electric source of the image-capturing element 102, the A/D converter 103, the monitor 105, and the image processing unit 106 is turned off in order to increase the amount of electric current used for the charging operation.

Next, the power circuit 111 switches the electric source of the electric current supplied to the digital camera 100, to an electric current supplied from the host device 200 from the charging type battery 112 via the USB cable 300 (step S3). When the power circuit 111 switches the electric source, the CPU 104 determines whether there was an access request from the host device 200 via the USB I/F 113 (step S4). Here, an access request refers to an access request for a reading-and-writing operation of the recording medium 110 or the flash ROM 108 of the digital camera 100 by the PTP command. Incidentally, the access request is outputted when the user operates the host device 200 and accesses the recording medium 110 or the flash ROM 108 of the digital camera 100 via the host device 200.

When the CPU 104 determines that there was not any access request from the host device 200 (step S4: NO), the CPU 104 rewrites the charging condition information, which is stored in the inner memory and indicates the condition of the charging type battery 112, to "high-speed charging condition" (step S5).

The charging condition information is a value referring to either one of a "high-speed charging condition," "low-speed charging condition," or "charging completed condition." The "high-speed charging condition" is a condition in which an electric current, other than the electric current necessary for the operation of the CPU 104, is allotted to the charging of the charging type battery 112. For example, when an electric current of 500 mA is supplied from the USB cable 300, and an electric current of 100 mA is necessary for the operation of the CPU 104, 400 mA of electric current is allotted to the charging of the charging type battery 112.

Meanwhile, the "low-speed charging condition" refers to a condition in which an electric current, other than an electric current necessary for the operation of the CPU 104 and an electric current allotted to the operation of the flash ROM 108 or the recording medium 110, is allotted to the charging of the charging type battery 112. For example, when an electric current of 500 mA is supplied from the USB cable 300, an electric current of 100 mA is necessary for the operation of the CPU 104, and the maximum value of the electric current of the electric source of the standard of the recording medium 110 is 200 mA, an electric current of 200 mA is allotted to the charging of the charging type battery 112.

Further, the "charging completed condition" refers to a condition in which the charging of the charging type battery 112 is completed, and no electric current is allotted to the charging of the charging type battery 112.

When the CPU 104 has rewritten the charging condition information from "low-speed charging condition" to "high-speed charging condition," the CPU 104 outputs to the electric current 111, a signal for changing the supply of the electric current to the charging type battery 112 to a "high-speed charging condition." On the other hand, when the CPU 104 has rewritten the charging condition information from "high-speed charging condition" to "low-speed charging condition," the CPU 104 outputs to the power circuit 111, a signal for changing the supply of the electric current to the charging type battery 112 to a "low-speed charging condition." The electric current 111 controls the amount of electric current supplied to the charging type battery 112 according to a signal which was inputted and received by the CPU 104.

In step S5, when the CPU 104 rewrites the charging condition information to the "high-speed charging condition," the CPU 104 determines whether or not the charging of the charging type battery 112 has been completed (step S6). The determination of whether the charging has been completed is conducted by the power circuit 111 outputting a signal notifying the CPU 104 that the charging has been completed when the charging of the charging type battery 112 is complete, and by the CPU 104 determining whether or not such a signal exists.

When the CPU 104 determines that the charging of the charging type battery 112 has not been completed (step S6: NO), the routine returns to step S4. Here, the CPU 104 determines again whether or not there is an access request by the host device 200. A procedure conducted when the CPU 104 determines that the charging of the charging type battery 112 has been completed (step S6: YES), is described later.

Meanwhile, when a determination is made in step S4 that there is an access request from the host device 200 (step S4: YES), the CPU rewrites the charging condition information, which is stored in the inner memory and indicates the condition of the charging type battery 112, to "low-speed charging condition" (step S7). At this time, when the CPU 104 has rewritten the charging condition information from "high-speed charging condition" to "low-speed charging condition," the CPU 104 outputs to the electric current 111, a signal for changing the supply of the electric current to the charging type battery 112, to the "low-speed charging condition."

In addition, it is possible to change the amount of electric current supplied to the charging type battery 112 depending on whether the access request is an access request to the flash ROM 108 or an access request to the recording medium 110. In more detail, the following control may be executed.

Suppose that an electric current of 500 mA is supplied from the USB cable 300, an electric current of 100 mA is necessary for operating the CPU 104, an electric current of 50 mA is necessary for operating the flash ROM, and an electric current of 200 mA is necessary to operate the recording medium 110. In this case, when the access request is an access request to the flash ROM 108, an electric current of 350 mA is allotted to the charging of the charging type battery 112. On the other hand, when the access request is an access request to the recording medium 110, an electric current of 200 mA is allotted to the charging of the charging type battery 112.

By executing the control described above, it is possible to more appropriately allot the electric current for charging the charging type battery 112.

In step S7, when the charging condition information is rewritten to the "high-speed charging condition," the CPU 104 determines whether or not the charging of the charging type battery 112 has been completed (step S8). When the CPU 104 determines that the charging of the charging type battery 112 has not been completed (step S8: NO), the CPU 104 executes an access to the flash ROM 108 or the recording medium 110 (step S9). In addition, when the access to the flash ROM 108 or the recording medium 110 has been completed, the CPU 104 begins to measure the time that has elapsed from the time at which the access has been completed. Here, the CPU 104 records the information on the measured time to the inner memory.

When the access to the flash ROM 108 or to the recording medium 110 has been completed, the CPU 104 again determines whether or not there is an access request from the host device 200 (step S10). When the CPU 104 determines that there was an access request from the host device 200 (step S10: YES), the routine returns to step S8. Then, it is determined whether or not the charging has been completed, and the access is executed again.

On the other hand, when the CPU 104 determines that there was not an access request from the host device 200 (step S10: NO), the CPU 104 refers to the timing information stored in the inner memory, and determines whether or not the time elapsed from the time at which the access was completed exceeds one minute (step S11). When the CPU 104 determines that the elapsed time has not reached one minute (step S11: NO), the CPU 104 determines whether or not the charging of the charging type battery 112 has been completed (step S12). When the CPU 104 determines that the charging has not been completed (step S12: NO), the routine returns to step S10. Once again, it is determined whether or not there is an access request from the host device 200.

In addition, in step S11, when the CPU 104 determines that one minute has elapsed (step S11: YES), the CPU 104 moves the process to step S5, and rewrites the charging condition information to "high-speed charging condition." In other words, when there is no access request within a predetermined amount of time since the access to the flash ROM 108 or the recording medium 110 has been completed, the CPU 104 changes the amount of electric current supplied to the charging type battery to an amount of electric current corresponding to the "high-speed charging condition." In this way, the number of times that the condition is transitioned between the "high-speed charging condition" and the "low-speed charging condition" can be reduced. In addition, it is possible to mitigate the burden on the charging type battery 112 due to the frequent increase and decrease in the amount of electric current that is supplied.

Furthermore, when the CPU 104 determines that the charging has been completed in step S6, step S8, and step S12 (step S6: YES, step S8: YES, step S12: YES), the CPU 104 rewrites the charging condition information stored in the inner memory to "charging completed condition" (step S13). Incidentally, when it is determined that the charging has been completed, the power circuit 111 automatically stops supplying the electric current to the charging type battery 112. As a result, in step S13, it is not necessary for the CPU 104 to output a signal to the electric current 111 for stopping the electric power supply to the charging type battery 112. In addition, when the CPU 104 rewrites the charging condition information to the "charging completed condition," the CPU 104 begins to measure the time that has elapsed since the charging condition information was thus rewritten to the "charging completed condition." At this time, the CPU 104 records the information on the measured time to the inner memory.

When the CPU 104 rewrites the charging condition information to the "charging completed condition," the CPU 104 waits for the reception of the access request from the host device 200 (step S14). Next, the CPU 104 determines whether or not there was an access request from the host device 200 (step S15). When the CPU 104 determines that there is an access request (step S15: YES), the CPU 104 executes an access to the flash ROM 108 or the recording medium 110 (step S16). When the CPU 104 completes the access to the flash ROM 108 or the recording medium 110, the routine returns to step S14. Then, the CPU 104 waits again for a reception of an access request. In addition, when the CPU 104 completes the access to the flash ROM 108 or the recording medium 110, the CPU 104 deletes the time information recorded in the inner memory. The CPU 104 also records the information on the elapsed time from this time.

On the other hand, when the CPU 104 determines in step S15 that there is no access request from the host device 200 (step S15: NO), the CPU 104 refers to the time information recorded in the inner memory, and determines whether the time elapsed from the access completion time exceeds 30 minutes (step S17).

After the CPU 104 determines that the elapsed time from the access completion time has not reached 30 minutes (step S11: NO), the routine returns to step S14, and waits again for a reception of an access request. On the other hand, when the CPU 104 determines that 30 minutes have elapsed from the access completion time (step S11: YES), the CPU 104 turns off the electric source of the digital camera 100 (step S18). As a result, it is possible to reduce the amount of electric current supplied to the host device 200 when there is no access to the digital camera 100.

In this way, according to the present embodiment, when there is no access request from the host device 200 during the charging of the charging type battery 112, an electric current other than the electric current necessary for operating the CPU 104 is allotted to the charging of the charging type battery 112. Meanwhile, when there is an access request from the host device 200 during the charging of the charging type battery 112, the amount of electric current supplied for the access to the flash ROM 108 or the recording medium 110 is reduced from the amount of electric current supplied to the charging type battery 112. As a result, it is possible to appropriately control the charging operation with respect to the charging type battery 112 which drives the digital camera 100.

Heretofore, the first embodiment of the present invention has been described in detail in reference to the diagrams. The concrete configuration is not limited to the examples described above. Various modifications and the like may be made within the gist of the present invention.

For instance, in the present embodiment, the CPU 104 made a determination in step S6, step S8, and step S12 indicated in the flowchart shown in FIG. 2 whether or not the charging has been completed. However, the present invention is not limited to this configuration. A similar process may be executed by notifying the CPU 104 of the completion of the charging by cutting in a signal reporting the completion of the charging from the power circuit 111.

In addition, an example in which the present embodiment of the present invention was applied to a digital camera was used in the above example. However, the present invention is not limited to this configuration. For instance, a similar effect may be achieved by applying the present invention to other electronic devices such as a portable phone or a music player.

Further, in the present embodiment, a case using a USB cable was described as a connecting wire which can supply an electric current of a predetermined rating and can transmit and receive information as well. However, the present invention is not limited to this configuration. It is possible to use other connection wires which enable the transmission and receiving of information as well as the supply of an electric current of a predetermined rating, such as a LAN (Local Area Network) cable.

In addition, in the present embodiment, an example was described in which, when the charging condition information was rewritten to the "low-speed charging condition" by accessing the recording medium 110, the power circuit 111 reduced the maximum value of the electric current of the electric source of the standard of the recording medium 110 from the amount of electric power supplied to the charging type battery 112. However, the present invention is not limited by this configuration. For example, when the CPU 104 can obtain the necessary amount of electric current of the recording medium 110, the electric circuit 11 may reduce the necessary amount of electric current of the recording medium 110 from the amount of electric power supplied to the charging type battery 112.

In addition, when the charging condition information is rewritten to the "low-speed charging condition," for example, the electric current 111 may stop the supply of the electric current to the charging type battery 112.

Incidentally, the present embodiment was described regarding a case in which the power circuit 111 controls the amount of electric current supplied to the charging type battery 112 when the recording medium 110 or the flash ROM 108 is accessed.

However, the present invention is not limited to this configuration. The power circuit 111 may control the amount of electric voltage supplied to the charging type battery 112. For example, in further detail, when an electric voltage of 5V is supplied from the USB cable 300, 1V of electric voltage is necessary to operate the CPU 104, and the maximum value of the electric voltage of the electric source of the standard of the recording medium 110 is 3.6V, and when the charging condition information is the "low-speed charging condition," the power circuit 111 may control the amount of electric voltage so that an electric voltage of 0.4V can be allotted for charging the charging type battery 112.

The digital camera 100 includes a computer system in the interior. In addition, the operation of the CPU 104 is recorded in the flash ROM 108 in the form of a program. The above process is executed by the computer reading out this program and executing the program. In addition, this computer program may be transmitted to a computer via a transmission network, and the computer that has received this transmission may execute this program.

Furthermore, the above program may be a program for executing a part of the feature described above. Moreover, the above program may be a program that realizes the above feature by being executed in combination with another program which is already recorded in the computer system. This type of program is known as a difference file (difference program).

Hereunder, a second embodiment of the present invention is described in detail with reference to the diagrams.

Figure 3A:
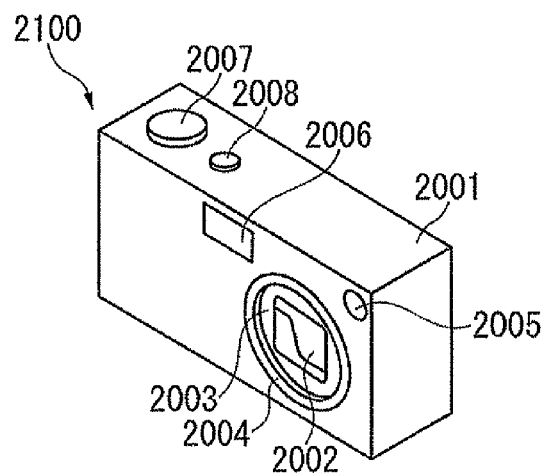
FIG. 3A is an overall diagram of a digital camera according to a second embodiment of the present invention.
Figure 3B:
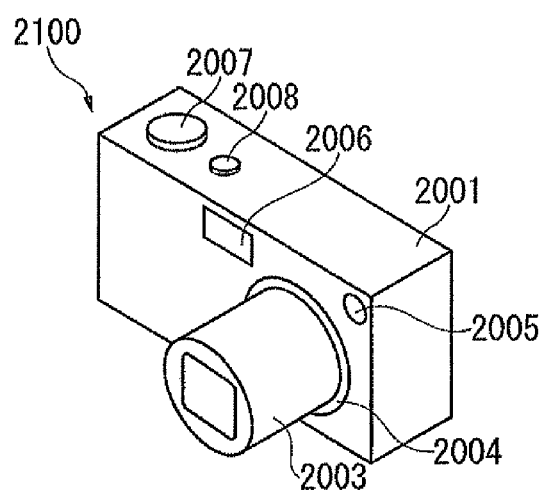
FIG. 3B is an overall diagram of a digital camera according to the above embodiment.
Figure 3C:
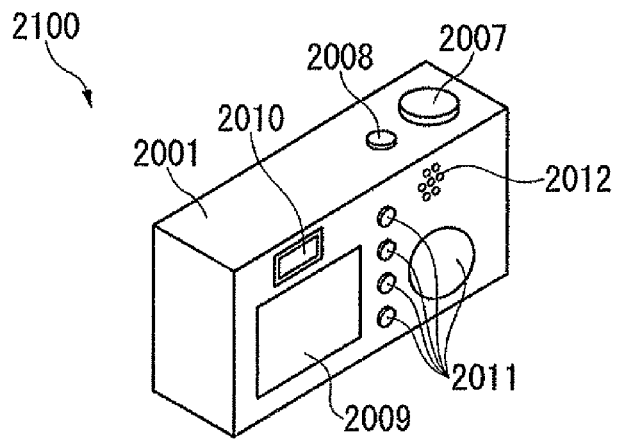
FIG. 3C is an overall diagram of a digital camera according to the above embodiment.

FIG. 3A is a frontal perspective view when a lens barrel 2003 is being collapsed. FIG. 3B is a frontal perspective view when a lens barrel 2003 is protruding. FIG. 3C is a back side perspective view.

As indicated in FIGS. 3A and 3B, a frontal surface of a camera body 2001 of a digital camera 2100 includes a lens barrel 2003, an ornamental ring 2004, a finder object window 2005, and a strobe window 2006. An opening-and-closing type lens barrier 2002 is provided on a frontal surface of the lens barrel 2003. A frontal surface of the ornamental ring 2004 is provided so as to be approximately on the same plane as a frontal surface of a front body of the camera body 2001. A front-most portion of the lens barrel 2003 is slightly receding from the frontal surface of the ornamental ring 2004, during a collapsed condition (a condition in which the lens barrel 2003 is stored inside the camera body 2001) in which the length in the direction of the optical axis is shorter than a photographing condition. The photographing condition refers to a condition during which a photograph is taken. In the collapsed condition, the lens barrier 2002 is closed, and a lens inside the lens barrel 2003 is protected (see FIG. 3A). When the lens barrel 2003 is protruded from the collapsed condition to a position at which a normal photographing is made possible, the lens barrier 2002 moves along with the initial driving. Thus, the lens barrier 2002 opens until the front-most surface of the lens barrel protrudes to the same plane as the front surface of the ornamental ring 2004. In addition, the lens barrier 2002 closes in combination with a final driving of the lens barrel 2003 when the lens barrel 2003 is driven to a collapsed condition from a position at which a normal photographing is made possible. In addition, the upper surface of the camera body 2001 includes a release button 2007 and a power source button 2008. As shown in FIG. 3C, the back surface of the camera body 2001 includes a monitor 2009, a finder ocular window 2010, an operating button 2011, and a sound reproduction unit (speaker) 2012.

Figure 4:
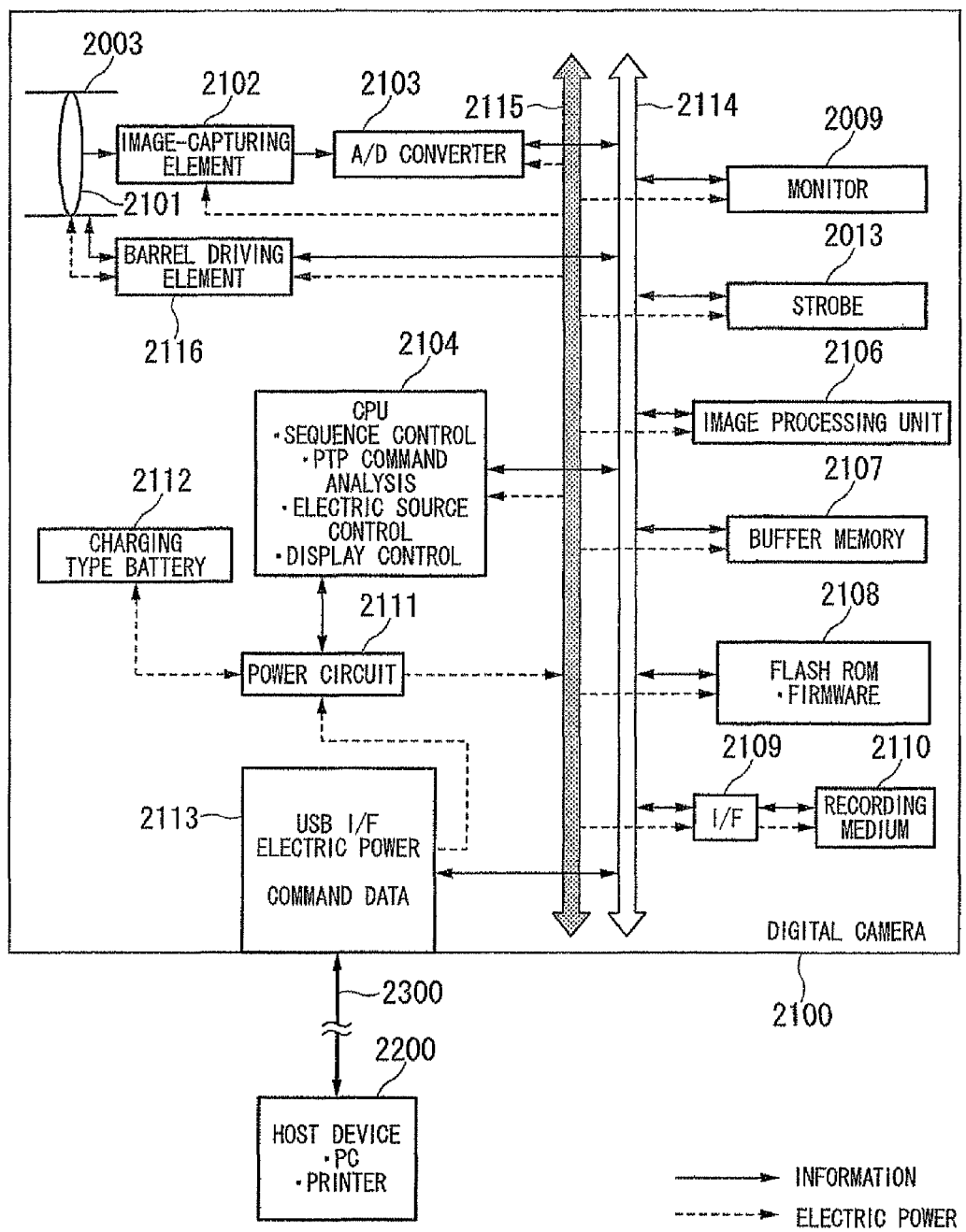
FIG. 4 is a functional structural diagram of a digital camera according to the above embodiment.

FIG. 4 is a functional configuration diagram of the digital camera 2100. The digital camera 2100 includes a lens barrel 2003, a monitor 2009, a strobe 2013, an imaging lens 2101, an image-capturing element 2102, an A/D (Analog/Digital) converter 2103, a CPU (Central Processing Unit) 2104, an image processing unit 2106, a buffer memory 2107, a flash ROM (Read Only Memory) 2108, a recording medium I/F (Interface) 2109, a recording medium 2110, a power circuit 2111, a charging type battery 2112, a USB I/F 2113, a bus 2114, a DCC (Direct Current Cable) 2115, and a barrel driving unit 2116.

The USB I/F 2113 is connected to a USB cable 2300. The USB I/F 2113 receives a command and a supply of electric current of a predetermined rating (for instance, a maximum of 500 mA) from a host device 2200 such as a PC and a printer. In other words, the digital camera 2100 communicates with the host device 2200 via the USB cable 2300. The digital camera 2100 also receives a supply of electric power from the host device 2200. The bus 2114 is a common pathway through which a signal is received and transmitted among each processing unit of the digital camera 2100. The DCC 2115 is a common pathway through which electric power is supplied to each processing unit of the digital camera 2100.

The power circuit 2111 charges the charging type battery 2112 with an electric current supplied by the USB cable 2300. In addition, the power circuit 2111 supplies electric current from the charging type battery 2112 to each processing unit of the digital camera 2100. The power circuit 2111 monitors the electric voltage between the terminals of the charging type battery 2112, and verifies the amount of charging made to the charging type battery 2112.

The A/D converter 2103 converts an image of the subject, which is formed on the image-capturing element 2102 through the imaging lens 2101, into a digital signal. The image processing unit 2106 receives and displays a live view (real time) image, a confirmation image after photographing, and a photographed image stored in the recording medium 2110. The live view image is obtained by performing a predetermined signal processing on a digital image signal obtained by the A/D converter 2103.

The barrel driving unit 2116 includes a motor. The barrel driving unit 2116 changes the condition of the lens barrel 2003. In detail, the barrel driving unit 2116, for instance, makes a transition between the photographing condition and the collapsed condition by an electric current exceeding the above predetermined standard and provided from the charging type battery 2112 (hereinafter, referred to as a "electric current for driving the lens barrel" for convenience). In addition, the barrel driving unit 2116 includes, for example, a photo interrupter, and determines whether or not the lens barrel 2003 is in a collapsed condition.

Incidentally, a certain condition of the digital camera 2100 exists according to the situation of the digital camera 2100. An example of a certain condition of the digital cameral 2100 when the USB cable 2300 is connected to the USB I/F 2113 is the collapsed condition of the lens barrel 2003. In other words, as a result of the condition transitioning from the photographing condition, the barrel driving unit 2116 determines whether or not a predetermined condition of the digital camera 2100 is in a collapsed condition in which the electric current for driving the lens barrel exceeding the predetermined standard is needed.

The flash ROM 2108 records a firm ware which specifies the basic controlling sequence of the digital camera 2100. In addition, the flash ROM 2108 records the digital image signal created by the A/D converter 2103. The recording medium I/F 2109 supplies electric current to the recording medium 2110, and performs a reading-and-writing operation of the recording medium 2110 according to the command by the CPU 2104. The recording medium 2110 is a memory car which is detachably attached to the digital camera 2100. This recording medium 2110 records the digital image signal created by the A/D converter 2103.

The monitor 2009 provides a user interface. For example, the monitor 2009 displays various information to the user by an electric current exceeding the predetermined standard and supplied by the charging type battery 2112 (hereinafter, referred to as an "electric current for display" for convenience). Examples of the displayed information includes an overall operation menu of the digital camera 2100, an operation menu regarding direct printing, various displays concerning conditions, and error messages. In addition, the monitor 2009 receives various inputs from the user.

The strobe 2013 charges electric load to a condenser, discharges the charged electric load, and radiates the subject to be photographed. In more detail, the strobe 2013 charges electric load to the condenser by an electric current exceeding the predetermined standard and provided by the charging type battery 2112 (hereinafter, referred to as an "electric current for charging the strobe" for convenience).

The CPU 2104 transmits information regarding the controlling of a sequence (order of execution), an analysis of a PTP (Picture Transfer Protocol), and the controlling of each processing unit such as the monitor 2009, the strobe 2013, the power circuit 2111, the barrel driving unit 2116, and the like. See solid lined arrow in FIG. 4.

According to the above configuration, the CPU 2104 controls the charging of the charging type battery 2112 by the power circuit 2111, as well as the supplying of the necessary electric current to each processing unit from the charging type battery 2112. In more detail, when the USB cable 2300 is connected to the USB I/F 2113, and it is determined by the barrel driving unit 2116 that the lens barrel 2003 is not in the collapsed condition, which is a predetermined condition, and it is confirmed by the power circuit 2111 that the electric current for driving the lens barrel cannot be supplied by the charging type battery 2112, the CPU 2104 makes the power circuit 2111 charge the charging type battery 2112 until the power circuit 2111 confirms that the electric current for driving the lens barrel can be supplied. Then, the CPU 2104 makes the power circuit 2111 supply the electric current for driving the lens barrel from the charging type battery 2112 to the barrel driving unit 2116.

In addition, when the USB I/F 2113 is connected to the USB cable 2300, and it is determined by the barrel driving unit 2116 that the lens barrel 2003 is in a collapsed condition, which is a predetermined condition, after the electric current for driving the lens barrel is supplied by the electric circuit 2111, the CPU 2104 makes the power circuit 2111 recharge the charging type battery 2112.

Hereinafter, an operation of the digital camera 2100 at the time of charging is described with reference to FIG. 5. The flowchart shown in FIG. 5 begins by the USB cable 2300 being inserted to the USB I/F 2113 (step S2001). Incidentally, the other end of the USB cable 2300 is assumed to be connected to the host device 2200.

The CPU 2104 makes the power circuit 2111 charge the charging type battery 2112 by the electric current supplied from the USB cable 2300 (step S2002). In other words, the power circuit 2111 follows the command of the CPU 2104, and switches the electric source of the electric current supplied to each processing unit to an electric current provided from the host device 2200 via the USB cable 2300 (step S2002).

Subsequent to step S2002, the CPU 2104 determines whether or not the lens barrel 2003 has been collapsed into the camera body 2001 (step S2003). In other words, the CPU 2104 determines whether or not the lens barrel 2003 is in a collapsed condition (step S2003). For instance, the CPU 2104 transmits to the barrel driving unit 2116, a command to determine the condition of the lens barrel 2003. When the CPU 2104 receives a response from the barrel driving unit 2116 to this command indicating a determination result that the lens barrel 2003 is in a collapsed condition, the CPU 2104 determines that the lens barrel 2003 is already collapsed inside the camera body 2001. When the CPU 2104 determines that the lens barrel 2003 is already collapsed inside the camera body 2001 (step S2003: YES), the routine proceeds to step S2008, skipping steps S2004 through S2007.

When the CPU 2104 determines that the lens barrel 2003 is not collapsed into the camera body 2001 (step S2003: NO), the CPU 1204 determines whether or not the charging type battery 2112 is charged by an amount greater than or equal to a predetermined amount (step S2004). For instance, when the charging type battery 2112 is charged by an amount greater than or equal to a predetermined amount, the power circuit 2111 sends a notification to the CPU 2104 indicating that the charging type battery 2112 is charged by an amount greater than or equal to a predetermined amount. The CPU 2104 determines whether or not the charging type battery 2112 has been charged by an amount greater than or equal to a predetermined amount depending on whether the above notification is received. Incidentally, the predetermined amount, which is a criterion for the above determination, is an electric voltage such that the electric current for driving the lens barrel can be supplied in order to transition the lens barrel 2003 from the photographing condition to the collapsed condition. An example of this predetermined amount is 3.4V. When the CPU 2104 determines that the charging type battery 2112 has not bee charged by an amount greater than the predetermined amount (step S2004: NO), the CPU 2104 repeats making this determination (step S2004) until it is determined that the charging type battery 2112 has been charged by an amount greater than or equal to the predetermined amount.

When the CPU 2104 determines that the charging type battery 2112 has been charged by an amount greater than a predetermined amount (step S2004: YES), the CPU 2104 makes the power circuit 2111 supply the current for driving the lens barrel from the charging type battery 2112 to the barrel driving unit 2116 (step S2005). In other words, the power circuit 2111 follows the command from the CPU 2104 and switches the power source of the electric current supplied to each processing unit from an electric current supplied by the host device 2200 via the USB cable 2300 to the charging type battery 2112. At the same time, the power circuit 2111 supplies the electric current for driving the lens barrel from the charging type battery 2112 to the barrel driving unit 2116 (step S2005). In other words, the power circuit 2111 stops the charging of the charging type battery 2112, and begins to supply the electric current for driving the lens barrel from the charging type battery 2112 to the barrel driving unit 2116.

Following step S2005, the CPU 2104 transmits a command to the barrel driving unit 2116 so that the condition of the lens barrel 2003 is transitioned to the collapsed condition. When the barrel driving unit 2116 receives this command, the barrel driving unit 2116 stores the lens barrel 2003 into the camera body 2001 by the electric current for driving the lens barrel supplied by the charging type battery 2112. In other words, the barrel driving unit 2116 makes the condition of the lens barrel 2003 transition to the collapsed condition (step S2006).

Following step S2006, the CPU 2104 charges the charging type battery 2112 by the electric current supplied to the power circuit 2111 from the USB cable 2300 (step S2007). IN other words, the power circuit 2111 follows the command from the CPU 2104 and switches the power source of the electric current supplied to the digital camera 2100 from the charging type battery 2112 to the electric current supplied by the host device 2200 via the USB cable 2300 (step S2007). In other words, the power circuit 2111 stops supplying the electric current for driving the lens barrel from the charging type battery 2112 to the barrel driving unit 2116, and begins charging the charging type battery 2112.

Following step S2003 (YES) or step S2007, the CPU 2104 determines whether or not the charging of the charging type battery 2112 has been completed (step S2008). For example, when the charging of the charging type battery 2112 has been completed, the power circuit 2111 sends a notification to the CPU 2104 that the charging has been completed. The CPU 2104 determines whether or not the charging of the charging type battery 2112 has been completed, according to whether or not there is the above mentioned notification. When the CPU 2104 determines that the charging of the charging type battery 2112 has not been completed (step S2008: NO), the routine returns to step S2003, and determines once again whether or not the lens barrel 2003 has been stored inside the camera body 2001. Meanwhile, when the CPU 2104 determines that the charging of the charging type battery 2112 has been completed (step S2008: YES), the processing of the flowchart shown in FIG. 5 is completed.

Figure 5:
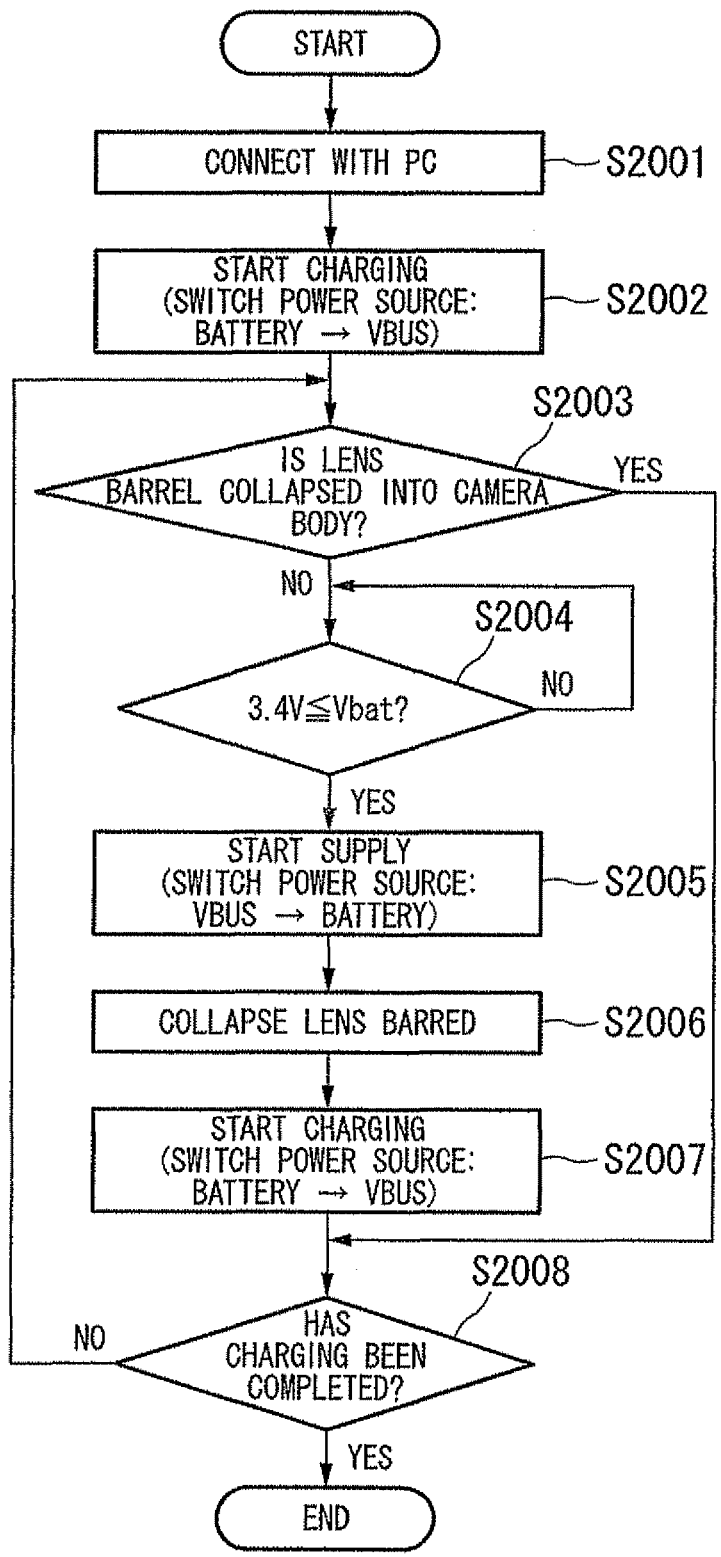
FIG. 5 is a flowchart representing an operation while charging a digital camera according to the above embodiment.

According to the flowchart shown in FIG. 5, even if the charging type battery 2112 has not been charged at all when the USB cable 2300 is connected to the digital camera 2100, the lens barrel 2003 of which is in a photographing condition, the charging type battery 2112 is charged gradually. When the capacity is reached such that the electric current necessary for driving the lens barrel 2003 can be supplied, the lens barrel 2003 transitions from the photographing condition to the collapsed condition according to the electric current supplied by the charging type battery 2112.

Heretofore, the second embodiment of the present invention has been described in detail in reference to the diagrams. However, the concrete configuration is not limited by the examples described above. Various modifications may be made within the gist of the present invention.

For example, according to the above embodiment, in step S2008 of the flowchart shown in FIG. 5, when the CPU 2104 determines that the charging of the charging type battery 2112 has not been completed (step S2008: NO), the CPU 2104 may repeat making this determination (step S2009) without returning to step S2004 until a determination is made that the charging of the charging type battery 2112 has been completed. In addition, in step S2003, the barrel driving unit 2116 followed the command from the CPU 2104 and determined whether or not the lens barrel 2003 is in a collapsed condition. Further, the CPU 2104 determined whether or not the lens barrel 2003 is already stored into the camera body 2001 based on the determination result obtained from the barrel driving unit 2116. However, for example, the barrel driving unit 2116 may temporarily store the information indicating the condition of the lens barrel 2003 after the transition into the buffer memory 2107, and the CPU 2104 may refer to the information being temporarily stored and determine whether or not the lens barrel 2003 is already stored inside the camera body 2001.

Further, in the above description, it was explained that an example of a predetermined condition of the digital camera 2100 when the USB cable 2300 is connected to the USB I/F 2113 is the collapsed condition. However, under this situation, the predetermined condition of the digital camera 2100 may be a strobe charging completion condition in which the charging of the strobe 2013 has been completed. Incidentally, in order to reach the strobe charging completion condition, the electric current for charging the strobe, which exceeds a predetermined standard, is necessary as described above. In addition, the CPU 2104, for instance, determines whether or not the strobe charging completion condition is reached, which is a predetermined condition in which the electric current for charging the strobe is necessary. As mentioned above, the electric current for charging the strobe is a necessary amount of electric current exceeding the predetermined standard.

In other words, when the predetermined condition of the digital camera 2100 when the USB cable 2300 is connected to the USB I/F 2113, and the strobe charging completion condition, which is a predetermined condition, has not been reached, and it is confirmed by the power circuit 2111 that the charging type battery 2112 cannot supply a predetermined amount of electric current exceeding the amount of electric current for charging the strobe, the CPU 2104 makes the power circuit 2111 charge the charging type battery 2112 until the power circuit 2111 confirms that an electric current exceeding the predetermined amount can be supplied. Then, the CPU 2104 may make the power circuit 2111 supply the predetermined amount of electric current from the charging type battery 2112 to the strobe 2013. Incidentally, the amount of electric current supplied from the charging type battery 2112 which has almost completed the charging process may be set as the above predetermined amount. By lagging the time that the charging is completed, by starting the charging of the strobe 2013 at a later time compared to the chargeable timing of the strobe 2013, it is possible to prevent the influence of the decline of the power of the strobe 2013 due to the self-discharging which begins after the charging is completed.

In addition, the predetermined condition of the digital camera 2100 in a situation in which the USB cable 2300 is connected to the USB I/F 2113 may be a display completion condition, which is a condition in which a predetermined content is displayed according to a demand by the monitor 2009. Further, in order for the display completion condition is reached, an electric current for display exceeding a predetermined standard is necessary, as described above. In addition, the CPU 2104 determines whether or not the display completion condition is reached. The display completion condition is a predetermined condition in which the electric current for displaying is needed. The electric current for displaying is a necessary amount of electric current exceeding a predetermined standard.

In other words, when the predetermined condition of the digital camera 2100 when the USB cable 2300 is connected to the USB I/F 2113, and the predetermined condition of the digital camera 2100 is the display completion condition, the display completion condition is not reached, and it is confirmed by the power circuit 2111 that the charging type battery 2112 cannot supply the electric current for displaying, the CPU 2104 makes the power circuit 2111 execute the charging process until the power circuit 2111 confirms that the electric current for displaying can be supplied. Then, the CPU 2104 may make the power circuit 2111 supply the electric current for displaying from the charging type battery 2112 to the monitor 2009.

According to the above second embodiment, while the charging type battery 2112 is being charged by an electric current of a predetermined standard via the USB cable 2300, it is possible to appropriately execute an operation such as the driving of the lens barrel 2003 which requires a large amount of electric current exceeding the predetermined standard, as well as operations such as the charging of the strobe 2013 and the output to the monitor 2009. Therefore, for example, it is possible to avoid the risk accompanying a situation in which the charging type battery 2112 is charged via the USB cable 2300 while the lens barrel 2003 is in a photographing condition (for instance, the risk that the imaging lens 2101 may be scratched or, the risk that the imaging lens 2101 may become dusty). In addition, when the charging type battery 2112 is being charged via the USB cable 2300, the strobe 2013 may be charged as well. Therefore, at least when the charging of the charging type battery 2112 has been completed, it is possible to immediately use the strobe 2013. In addition, when the charging type battery 2112 is being charged via the USB cable 2300, for instance, electric current is supplied to the monitor 2009. As a result, it is possible to conduct an operation such as direct print via the monitor 2009.

Moreover, according to the above description regarding the present embodiment, an instance in which the CPU 2104 controls the electric current was described as an example of an electric power control of the charging of the charging type battery 2112 and a control of the electric power supplied to each processing unit from the charging type battery 2112. However, the CPU 2104 may control the electric voltage.

In addition, an example in which the present embodiment of the present invention was applied to a digital camera was used in the above example. However, the present invention is not limited to this configuration. For instance, a similar effect may be achieved by applying the present invention to other electronic devices such as a portable phone or a music player.

Further, in the present embodiment, a case using a USB cable as a power feeding cable was described. However, the power feeding cable according to the present invention is not limited to a USB cable. For instance, a connecting wire such as a LAN (Local Area Network) cable, which can supply an electric current of a predetermined standard, may be used. In addition, instead of using a USB cable or a LAN cable which are cables that can transmit and receive information, it is also possible to use a connection wire which can simply supply an electric current of a predetermined standard.

The digital camera 2100 includes a computer system in the interior. In addition, the operation of the CPU 2104 is recorded in the flash ROM 2108 in the form of a program. The above process is executed by the computer reading out this program and executing the program. In addition, this computer program may be transmitted to a computer via a transmission network, and the computer that has received this transmission may execute this program.

Furthermore, the above program may be a program for executing a part of the feature described above. Moreover, the above program may be a program that realizes the above feature by being executed in combination with another program which is already recorded in the computer system. This type of program is known as a difference file (difference program).

While a preferred embodiment of the present invention has been described above, it should be understood that these are exemplary of the invention and are not to be considered as limiting the present invention. Additions, omissions, substitutions, and other modifications can be made without departing from the scope of the present invention. The invention is not to be considered as being limited by the foregoing description, and is only limited by the scope of the appended claims.

What is claimed is:

1. An electronic device comprising:
a connecting unit connected to a connection line from which an electric power of a predetermined rating is supplied to the electronic device and via which the electronic device transmits and receives an information;
a power circuit conducting a charging of a charging battery built within the electronic device, using a first amount of the electric power supplied by the connection line;
an interface supplying a second amount of the electric power supplied to an operation of a recording medium storing an information, the interface performing a reading-and-writing operation of the recording medium;
an electric source controlling unit:
  allocating a portion of the first amount of the electric power supplied to the second amount of the electric power when it is required based on the second amount of the electric power supplied;
  reducing an electric power required for operating the recording medium from the electric power supplied to the power circuit in a case where the recording medium is built within the electronic device and reducing a maximum value of the electric source of a standard of the recording medium from the electric power supplied to the power circuit in a case where the recording medium is capable of attaching to and detaching from the electronic device, when the interface performs the reading-and-writing operation of the recording medium according to an access request to the recording medium via the connection line; and
  turning off an electric source after a predetermined time has elapsed from a later time of a time when the charging has been completed by the power circuit or a time when the reading-and-writing operation has been completed by the interface after the charging has been completed.

2. The electronic device according to claim 1, wherein the electric source controlling unit reduces an amount of electric power supplied for performing the reading-and-writing operation from an amount of electric power supplied to the charging battery.

3. The electronic device according to claim 1, wherein the electric source controlling unit returns the amount of electric power supplied to the power circuit to a previous amount of electric power before the control is performed, when the access request does not exist within a predetermined amount of time after the reading-and-writing operation by the interface is completed.

4. The electronic device according to claim 1, wherein the electric source controlling unit alters the amount of electric power supplied to the power circuit according to a type of the recording medium.

5. The electronic device according to claim 1 further comprising:
a lens barrel driving unit that determines whether or not the electronic device is in a stored condition while the connection line is connected, the electronic device requiring a predetermined necessary electric power exceeding a predetermined rating to transition from a photographing condition to the stored condition, wherein
the power circuit confirms a charging amount of the charging battery, the power circuit supplying an electric power from the charging battery; and
while the connection line is connected, if the lens barrel driving unit determines that the electronic device is not in the stored condition, and if the power circuit confirms that the predetermined necessary electric power cannot be supplied by the charging battery, the electric source controlling unit makes the power circuit supply the predetermined necessary electric power from the charging battery after the electric source controlling unit makes the power circuit conduct the charging.

6. The electronic device according to claim 5, wherein
the stored condition defines a condition of a lens barrel transitioned by the lens barrel driving unit such that a length of the lens barrel in an optical axis direction is shorter as compared to that in the photographing condition during which a photographing is conducted;
the predetermined necessary electric power is a required electric power for driving the lens barrel when the condition of the lens barrel is transitioned from the photographing condition to the stored condition by the lens barrel driving unit; and
while the connection line is being connected, if the lens barrel driving unit determines that the electronic device is not in the stored condition, and if the power circuit confirms that the required electric power for driving the lens barrel cannot be supplied by the charging battery, the electric source controlling unit makes the power circuit supply the electric power for driving the lens barrel to the lens barrel driving unit after the electric source controlling unit makes the power circuit conduct the charging until the lens barrel driving unit confirms that the required electric power for driving the lens barrel can be supplied.

7. The electronic device according to claim 5 wherein, while the connection line is connected, when the lens barrel driving unit determines that the electronic device is in the stored condition, the electric source controlling unit again makes the power circuit perform the charging.

8. A method of controlling an electronic power supply of an electronic device comprising a power circuit, an electric source controlling unit, and an interface, the method comprising:
- charging, by the power circuit, of a charging battery built within the electronic device, using a first amount of an electric power supplied by a connection line from which an electric power of a predetermined rating is supplied to the electronic device and via which the electronic device transmits and receives an information;
- performing, by the interface, using a second amount of the electric power supplied, a reading-and-writing operation of a recording medium recording an information;
- allocating, by the electronic source controlling unit, a portion of the first amount of the electric power supplied to the second amount of the electric power supplied when it is required based on the second amount of the electric power supplied;
- reducing, by the electric source controlling unit, an electric power required for operating the recording medium from the electric power supplied to the power circuit in a case where the recording medium is built within the electronic device and reducing, by the electric source controlling unit, a maximum value of the electric source of a standard of the recording medium from the electric power supplied to the power circuit in a case where the recording medium is capable of attaching to and detaching from the electronic device, when the interface performs the reading-and-writing operation of the recording medium recording the information according to an access request to the recording medium via the connection line;
- supplying, by the interface, an electric power to the recording medium; and
- turning off, by the electric source controlling unit, an electric source after a predetermined time has elapsed from a later time of a time when the charging has been completed by the power circuit or a time when the reading-and-writing operation has been completed by the interface after the charging has been completed.

9. The method of controlling the electronic power supply according to claim 8, wherein
the electronic device further comprises a lens barrel driving unit that transitions a lens barrel between a stored condition and a photographing condition,
the method further comprises:
- determining, by the lens barrel driving unit, whether or not the lens barrel is in the stored condition, the electronic device requiring a predetermined necessary electric power exceeding a predetermined rating to transition from the photographing condition to the stored condition;
- confirming, by the power circuit, a charging amount of the charging battery; and
- supplying, by the power circuit, an electronic power from the charging battery, wherein
while the connection line is being connected, if it is determined that the lens barrel is not in the stored condition, and if it is confirmed that the predetermined necessary electric power cannot be supplied by the charging battery, the electric source controlling unit makes the power circuit supply the predetermined necessary electric power from the charging battery after the electric source controlling unit makes the power circuit conduct the charging.

10. An electric device comprising:
a connecting unit connected to a connection line from which an electric power of a predetermined rating is supplied to the electronic device and via which the electronic device transmits and receives an information;
a charging unit and an interface;
an electronic source controlling unit performing a control such that:
  (i) a first amount of the electric power is supplied to the charging unit for charging of a charging battery that is built within the electronic device;
  (ii) while charging the charging battery, a second amount of the electric power is also supplied to the interface used for operation of a recording medium storing an information, wherein the interface is configured to perform a reading-and-writing operation of the recording medium; and
  (iii) the electronic source controlling unit reducing the electronic power being supplied to the charging unit for charging the charging battery based on the electric power required for performing the request for the reading-and-writing operation.

* * * * *